Feb. 3, 1953     H. H. FINK ET AL     2,627,360
HOLLOW ARTICLE
Filed April 1, 1949
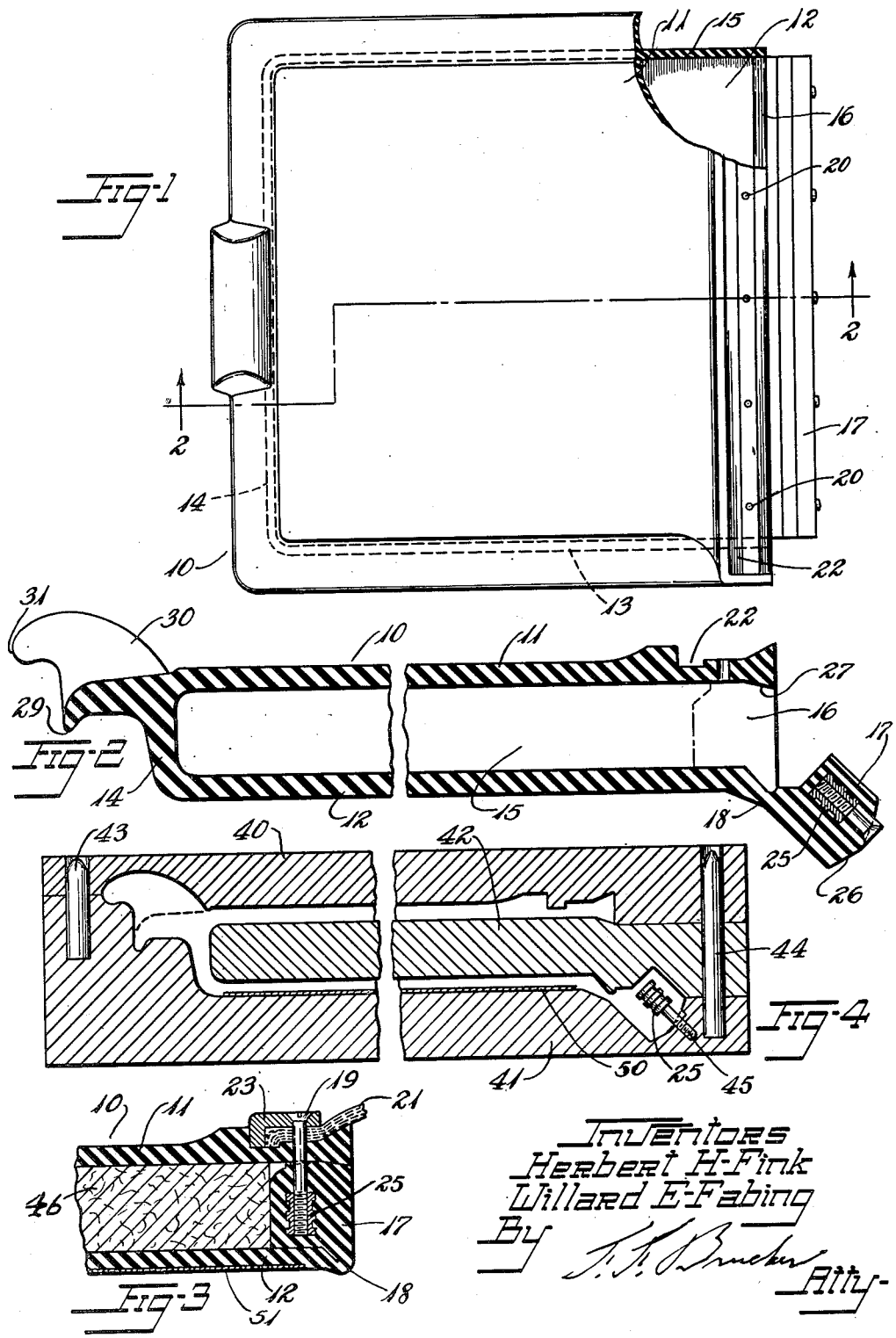

Patented Feb. 3, 1953

2,627,360

UNITED STATES PATENT OFFICE 2,627,360

HOLLOW ARTICLE

Herbert H. Fink and Willard E. Fabing, Akron, Ohio, assignors to The B. F. Goodrich Company, New York, N. Y., a corporation of New York Application April 1, 1949, Serial No. 84,808

2 Claims. (Cl. 220—24)

This invention relates to the manufacture of hollow articles of resilient, pliable, and moldable material, and is especially useful in the manufacture of hollow insulated lids for freezer cabinets and the like, although the invention is also useful in the manufacture of other hollow articles.

The lids of containers for ice cream, deep freezers, and frozen food cabinets have usually been made hollow and filled with insulating material. Heretofore it has been proposed to mold the lids of vulcanizable rubber or other material except for the bottom or inner wall which was to be of a stainless steel plate forced into grooves in the side walls of the lid. Such a construction has had the disadvantage that it was not air or liquid tight. It presented a joint between the rubber and metal which was exposed to the interior of the cabinet and was unsanitary. As such lids were usually provided as hinged pairs, difficulty was also experienced in that metal parts such as hinges and hinge bolts subject to corrosion were present at the inner face of the lid.

It is an object of the present invention to provide a one piece hollow article of molded material having initially an opening for removing a core and an attached plug-like closure member for finally closing the opening.

It is another object to provide in core molding a hollow article for an improved manner of closing the opening through which the core is withdrawn from the article.

Another object is to provide for reinforcing an open-ended hollow molded article by the provision of a hinged plug-like closure member at its margin.

Further objects of the invention are to provide a cabinet lid having a closure face free from metal parts or joints at the inside of the cabinet and to provide a novel method of securing the portions of the lid in operative position.

Still further objects are to provide a one piece hollow lid having a pocket and a closure member therefor in continuity of each other, to secure the closure member in the mouth of the pocket without exposing metal parts to the interior of the cabinet, to provide for fastening the closure member and at the same time hinging the lid, and to provide a handle integral with the lid.

These and other objects will appear from the following description and the accompanying drawings.

Referring to the drawings,

Fig. 1 is a plan view of a freezer lid showing an embodiment of the invention as it comes from the mold, one corner being broken away and shown in section.

Fig. 2 is a sectional view thereof, taken on line 2—2 of Fig. 1.

Fig. 3 is a similar sectional view of a portion of the lid with the closure member in closing position and the hinge in place.

Fig. 4 is a cross sectional view of a mold.

Referring to the drawings which illustrate one embodiment of the invention, the numeral 10 designates a hollow molded article of semi-hard rubber or other rubber-like composition having some flexibility and resilience but sufficiently stiff to hold its shape without reinforcement. The hollow article has an integrally formed top wall 11, bottom wall 12 and side walls 13, 14 and 15. Between the top and bottom walls and the end walls 13, 15 is an opening 16 through which a core for molding the interior of the article may be removed. Also molded integrally with the article adjacent the opening 16 is a closure wall member 17 connected to one of the top and bottom walls by a pliable hinge portion 18 which may be entirely of rubber composition or may be reinforced by fabric embedded in the rubber composition to prevent cracking when the hinge portion is flexed. The closure member is attached, preferably to the bottom wall 12, entirely across the bottom wall and is of such shape as to fit snugly in the opening 16 by bending of the hinge portion 18.

The closure wall member may be held in place in the opening by fastening means such as screws 19 which extend through apertures 20 in the top wall near its margin and engage in the closure wall member. The closure wall member may be additionally sealed in place by a coating of cement.

Preferably the closure wall member is provided at the hinge margin of the lid and the screws 19 may serve the dual purpose of securing a hinge 21 and the closure member 17 to the top wall 11 of the lid. For this purpose the top wall may be formed with a suitable recess 22, a rubber and fabric hinge 21 may extend over the recess, and a hinge retaining plate 23 of metal may be seated over the hinge strip and within the recess. The hinge strip and the retaining plate are perforated to receive the screws 19 which extend therethrough. While ordinary wood screws may be employed, it is preferred to embed internally threaded spuds 25 in the rubber-like material of the closure member 17 and to employ machine screws for securing the parts in place.

As the material of the lid is slightly stretchable the closure member may be made to fit the opening with the walls under slight tension. Also, the closure may be beveled, as at 26 and a complementary beveled ridge 27 may be provided on the top wall to cooperate therewith in retaining the closure in the opening.

The lid is preferably made with a downwardly turned flange 29 around three sides of the lid at the top wall for seating about the mouth of a cabinet and a knob 30 for lifting the lid may be formed on the flange opposite the hinged side.

In the finished article, the bottom wall is reinforced and supported entirely across the lid by its attachment to the closure wall entirely thereacross and its disposition perpendicular to that wall, whereby no screws or other metal members are exposed at the bottom face of the lid. The hinge clamp plate 23 stiffens the top wall across the lid together with the closure-wall member to which it is secured, and the hinge 21 is retained by the same means.

As the closure wall 17 not only is fitted in close conformity in the opening, but also is integral with and hingedly connected to the article, its effect as a stiffening member at the end of the article is thereby increased.

In molding the article, the entire article may be molded between a pair of mold plates having a parting line extending from the tip 31 of the knob along the lip of the flange 29 to the open end of the article; the core being supported by an overhanging portion between the mold plates, and the cavity in one plate forming with the core surface the closure wall member. This is shown in Fig. 4 where the mold plates 40, 41 are shown assembled about the core 42, the core and the mold plates being held in alignment by dowel pins 43, 44. Pins 45 are mounted in the plate 41 to support the spuds 25.

After the article is molded, it is removed from the mold and core, the closure member is then forced into the opening 16 and secured therein. Before closing the article it may be filled with insulating material 46 which may be loose material or in the form of a cellular body. The closure member may be coated with rubber cement before inserting it. This acts as a lubricant and then cements the closure in place.

It is preferred to have the lower face of the article free from metal parts subject to corrosion. In cases where it is desired to provide a sheet of metal across the lower face as for better reflection of heat a plate 50 of sheet metal, such as stainless steel may be inserted in the mold before the mold is filled with rubber composition as shown in Fig. 4, and the metal plate may be bonded to the rubber material during vulcanization of the rubber to provide a metal facing 51 as seen in Fig. 3. Where such a metal plate is present, it provides additional reinforcement of the article.

After the closure is in place, the screws 19 are inserted and driven in place to secure the hinge and the closure.

Variations may be made without departing from the scope of the invention as it is defined by the following claims.

We claim:

1. A one piece lid for a freezer cabinet, said lid comprising a hollow body of resilient material having spaced apart top and bottom walls, side walls connecting said top and bottom walls, a closure member integrally attached to said bottom wall directly adjacent and entirely across an opening between said side walls and said top and bottom walls by a pliable hinge connection, said closure member being adapted to close said opening by movement about its hinge connection, and means for securing the margin of said top wall to said closure member when said member is seated in said opening, said securing means including a metal plate for seating upon said top wall and screws extending through said plate and a margin of said top wall and secured in said closure member, the hinging of said closure member to the bottom wall providing for stiffening of said bottom wall entirely thereacross.

2. A one piece lid for a freezer cabinet, said lid comprising a hollow body of resilient material having spaced apart top and bottom walls, side walls integrally connecting said top and bottom walls along three sides leaving one side open, a plug-like closure member integrally attached to said bottom wall entirely along one edge of said opening by a pliable hinge connection, said closure member being substantially thicker than said top and bottom walls and being adapted to enter said opening as a plug and close said opening by movement about its hinge connection, and means for securing the margin of said top wall to said plug-like closure member when said member is seated in said opening comprising fasteners extending through a margin of said top wall and secured to said plug-like closure member, said plug-like closure member providing for stiffening of said bottom wall entirely thereacross.

HERBERT H. FINK.
WILLARD E. FABING.

REFERENCES CITED

The following references are of record in the file of this patent:

UNITED STATES PATENTS

| Number | Name | Date |
| --- | --- | --- |
| 439,451 | Ward | Oct. 28, 1890 |
| 2,200,395 | Lobl | May 14, 1940 |
| 2,251,661 | Colley | Aug. 5, 1941 |
| 2,283,448 | Malek | May 19, 1942 |
| 2,321,753 | King | June 15, 1943 |
| 2,331,512 | Siedschlag | Oct. 12, 1943 |
| 2,361,555 | McWhorter et al. | Oct. 31, 1944 |